(No Model.)

J. HARRISON.
EXPANDING MANDREL.

No. 257,220. Patented May 2, 1882.

Witnesses.
James L. Norris.
John J. Halsted.

Inventor
Joseph Harrison
G. W. H. Babcock
Attorney

UNITED STATES PATENT OFFICE.

JOSEPH HARRISON, OF MANCHESTER, COUNTY OF LANCASTER, ENGLAND, ASSIGNOR TO HENRY BERNOULLI BARLOW, OF SAME PLACE.

EXPANDING MANDREL.

SPECIFICATION forming part of Letters Patent No. 257,220, dated May 2, 1882.

Application filed February 4, 1882. (No model.) Patented in England March 9, 1881.

*To all whom it may concern:*

Be it known that I, JOSEPH HARRISON, of Manchester, in the county of Lancaster, England, have invented a new and useful Expanding Mandrel, (for which I have obtained a patent in Great Britain, No. 1,000, bearing date March 9, 1881,) of which the following is a specification.

The objects of my improvements are to produce a mandrel that shall possess great rigidity, and on which articles having a hole partly or wholly through them may be rapidly and efficiently secured and released without the use of a hammer or press. I attain these objects by the mechanism illustrated in the accompanying drawings, in which—

Figure 1:
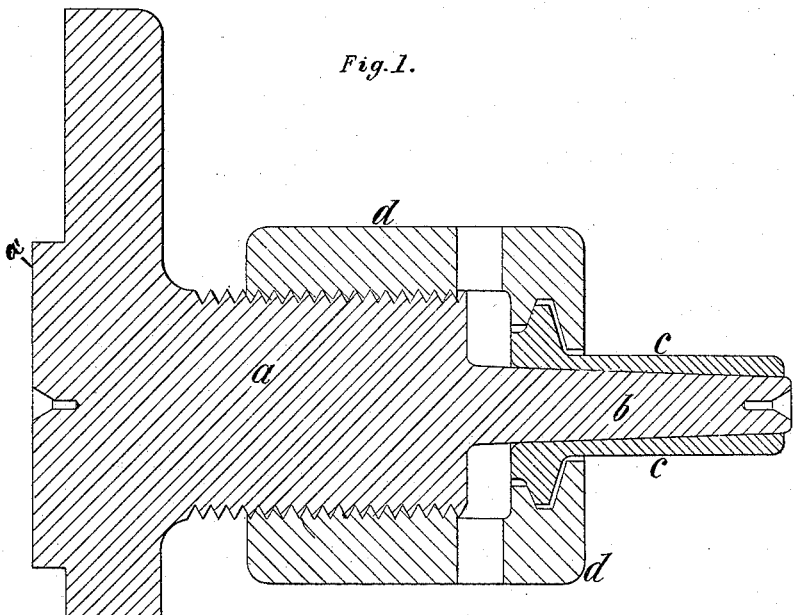
Figure 2:
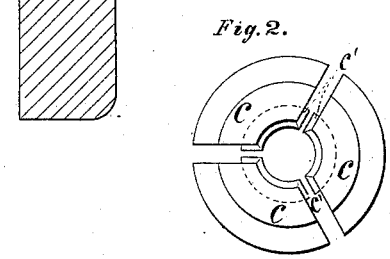
Figure 3:
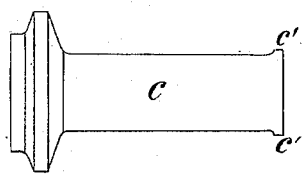
Figure 4:
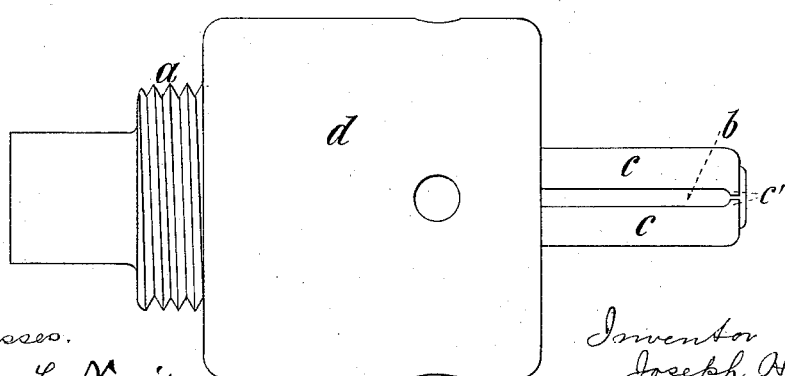

Figure 1 is a sectional elevation of my improved expanding mandrel. Fig. 2 is an end view of the three segmental dies or jaws, and Fig. 3 is a plan of a segmental die. Fig. 4 is a view of my expanding mandrel without the flange.

$a$ is a flanged metal boss.

$b$ is a taper spindle of circular section, which is made in one piece with or screwed or otherwise fixed tightly into the flanged boss.

$c\ c\ c$ are dies formed concave on the inner surface to fit the taper spindle and convex on the outer surface, all parts of the periphery of the dies being equidistant from the center of the spindle $b$, except where they are flanged.

$d$ is a nut or cap, the rim of which is recessed to receive the flanges on the dies $c$. This nut is chased to fit a screw-thread formed on the boss $a$. The mandrel is secured to the face-plate of the lathe or other tool by bolts passed through holes in the flange, and the annular projection $a'$ on the flange is fitted in a corresponding recess in the face-plate to insure the mandrel running true. I form projections $c'$ (see Fig. 3) on the sides of the dies at the end, to keep them from resting too close together and leaving a large space at the periphery.

The mandrel shown on Fig. 4 may be placed in the lathe or other tool centers and turned by a carrier or "dog" fixed on the end, as on an ordinary mandrel, if desired. The boss and the spindle are made, by preference, of one piece, and the cap and dies are fitted as before described. This mandrel may be fitted into the taper hole of the head-stock or spindle of machine-tools or made to screw onto the nose of the tool-spindle.

The dies $c\ c\ c$ are made from one piece of metal, which is bored taper, so as to fit the taper spindle $b$, then turned till the diameter of the portion forming the holding-surface is exactly one standard inch, (or other desired diameter.) A suitable flange is formed to be held by the nut or cap. This cylindrical piece is then divided into three equal parts by cutting it longitudinally with a milling-tool or otherwise.

When a collar or other article to be operated upon is placed on the dies $c\ c\ c$ the nut $d$ is tightened on the boss by a lever until the dies are drawn so far up the spindle as to hold the article securely on the dies. When it is to be removed the nut is slackened, and the article is released and can at once be taken off.

My improved mandrel is applicable to all classes of machine-tools for holding pulleys, wheels, collars, and all other articles which can be held on a mandrel. It is especially adapted to hold such hollow articles as railway-buffers and screw-jack heads, which have a hole that does not extend quite through them, while they are being turned and finished in the lathe or other machine.

The dies or split bushes may be parallel, taper, or of any configuration, or flat, to enter a square hole on their outer surface; and in order to change the dies it is only necessary to unscrew the cap and replace one set of dies by another of different size or shape. Split collars or bushes bored to fit the dies on the mandrel can be put on them, in order to hold articles with holes of larger diameter.

The mandrel will also hold the tool or tools for sinking Artesian wells. For this purpose I flute the dies or segments and place a bush over the shank of the tool to secure the boring or other tool.

I am aware that prior to my invention expanding mandrels have been made with three keys fitted in grooves in a spindle and operated by a nut and in other ways. I therefore do not claim the combination of a spindle with dies and nut, broadly; but What I do claim as my invention, and desire to secure by Letters Patent, is—

1. In an expanding mandrel, the boss $a$, having a flange at its outer end, said flange having a projection, $a'$, for the purpose set forth.

2. The combination, with boss $a$, having tapering spindle $b$, of the nut $d$ and the dies $c$, said dies being formed concave on the inner surface to fit the surface of the spindle, and provided with projections $c'$, substantially as shown and described.

3. The solid tapering spindle $b$, formed with or attached to boss $a$, in combination with the dies $c$, each provided at its outer end with a projection, $c'$, and at its inner end with a flange which connects with nut $d$, substantially as and for the purpose set forth.

4. The combination, with boss $a$, having solid spindle $b$ and dies $c$, of the nut $d$, which engages at one end with said boss by means of screw-threads and at the other end with the dies by means of a recessed part, which fits and connects with a flange formed on the dies, substantially as set forth.

JOSEPH HARRISON.

Witnesses:
CHAS. A. BARLOW,
HERBT. R. ABBEY.